2,794,026
Patented May 28, 1957

2,794,026

THIAPYRYLIUM AND THIOPHENIUM COMPOUNDS

Howard Johnston, Concord, Calif., assignor to The Dow Chemical Company, Midland, Mich., a corporation of Delaware No Drawing. Application April 11, 1955,
Serial No. 500,673

6 Claims. (Cl. 260—327)

This invention is concerned with compounds having the formula

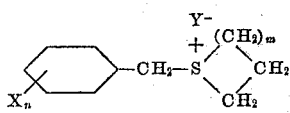

In this and succeeding formulae, X represents halogen of the group consisting of chlorine and bromine, n is an integer from 1 to 5, inclusive, Y represents chlorine, bromine or iodine and m is one of the integers 2 or 3. In the above formula the structure, $(CH_2)_m$, represents an ethylene or trimethylene radical. These new compounds are crystalline solids which are somewhat soluble in water and ionizing solvents such as alcohol, and of very low solubility in non-polar organic solvents. They are valuable as active toxic constituents of disinfectant and germicidal compositions for the control of many bacterial and fungal organisms.

The new compounds may be prepared by mixing or blending tetrahydrothiophene or tetrahydrothiapyran with a halobenzyl halide of the formula

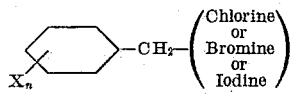

The reactants may be brought together in an inert organic solvent such as nitromethane. The amounts of the reactants to be employed are not critical, some of the desired product being obtained when any proportion of ingredients is employed. Good results are obtained when employing substantially equimolecular proportions of halobenzyl halide and tetrahydrothiophene or tetrahydrothiapyran. The reaction is somewhat exothermic and takes place smoothly at temperatures of 15°–50° C. The temperature may be controlled by regulating the rate at which the reagents are combined and/or by employing external cooling. During the reaction, the desired product usually separates from the reaction medium as a crystalline solid. When the product does not separate during the course of the reaction, precipitation of the product may then be effected by cooling and diluting the reaction mixture with a non-polar solvent or solvent mixture such as a benzene-hexane mixture. Following the reaction, the product may be separated by filtration and thereafter purified by washing with an inert organic solvent and by recrystallizing from a polar solvent such as alcohol.

In carrying out the reaction, the appropriate halobenzyl halide, tetrahydrothiophene or tetrahydrothiapyran, and solvent, if employed, are combined with stirring and at a temperature of from 15° to 50° C. Following the reaction, the product is separated and purified as previously described.

The following examples illustrate the invention but are not to be construed as limiting:

Example 1.—1 - (o-chlorobenzyl)hexahydrothiapyrylium iodide

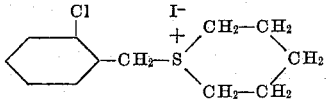

29.7 grams (0.117 mole) of o-chlorobenzyl iodide was dissolved in 30 milliliters of nitromethane and 12.0 grams (0.117 mole) of tetrahydrothiapyran added to the above solution in one portion. The temperature on addition rose to 34° C. After one-half hour, the reaction mixture was cooled and diluted with about 40 milliliters of a benzene-hexane mixture. During the dilution a product precipitated in the mixture as a crystalline solid. Upon removing the solid material by filtration and thereafter successively washing with benzene and drying, a 1-(o-chlorobenzyl)hexahydrothiapyrylium iodide product, melting at 95°–96° C. was obtained in 72 percent yield. The latter had a sulfur content of 9.02 percent and an iodine content of 35.62 percent.

Example 2.—1 - (o-chlorobenzyl)tetrahydrothiophenium iodide

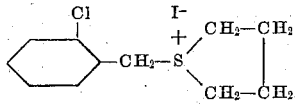

50.0 grams (0.198 mole) of o-chlorobenzyl iodide was added to 17.4 grams (0.198 mole) of tetrahydrothiophene. The compounds reacted with evolution of heat and the mixture became nearly completely solid in one-half hour. The mass was then cooled to room temperature and the solid filtered from the unreacted material and recrystallized from ethanol. As a result of these operations, there was obtained a 43 percent yield of a 1-(o-chlorobenzyl)tetrahydrothiophenium iodide product melting at 86°–88° C. and containing 37.1 percent iodine.

Example 3.—1 - (p-chlorobenzyl)tetrahydrothiophenium iodide

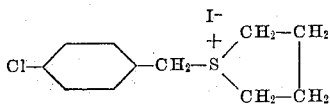

13.0 grams (0.147 mole) of tetrahydrothiophene was added with stirring to 37.0 grams (0.147 mole) of p-chlorobenzyl iodide. The reaction was accompanied by the evolution of heat and external cooling was employed to keep the mixture below 50° C. One-half hour following the addition, a precipitated material was separated from the reaction mixture by filtration, washed several times with dichloromethane and amounted to a 73 percent yield of a 1-(p-chlorobenzyl)tetrahydrothiophenium iodide product melting at 108°–110° C. The product was insoluble in acetone and contained 37.06 percent iodine, 10.58 percent chlorine and 9.35 percent sulfur.

Example 4.—1-(2,4-dichlorobenzyl)tetrahydrothiophenium iodide

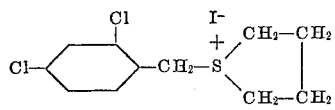

17.6 grams (0.200 mole) of tetrahydrothiophene was added in one portion to a solution of 57.4 grams (0.200 mole) of 2,4-dichlorobenzyl iodide in 60 milliliters of warm nitromethane. A solid mass formed in the reaction mixture in about 15 minutes and was separated by filtration and successively washed with benzene and a benzene-hexane mixture. As a result of these operations, there was obtained a 69.4 percent yield of a 1-(2,4-dichlorobenzyl)tetrahydrothiophenium iodide product melting at 96°–97° C. and containing 8.55 percent sulfur and 34.28 percent iodine.

*Example 5.—1 - (o-chlorobenzyl)tetrahydrothiophenium bromide*

50.0 grams (0.244 mole) of o-chlorobenzyl bromide was added slowly with stirring to 25.0 grams (0.284 mole) of tetrahydrothiophene and thereafter stirring continued for twenty hours at room temperature. A white solid formed during the reaction and was separated by filtration and washed several times with hot benzene. As a result of these operations, there was obtained an 87 percent yield of a 1-(o-chlorobenzyl)tetrahydrothiophenium bromide product. The latter melted at 105°–107° C., and was soluble in ethanol and water and of very low solubility in benzene and xylene.

*Example 6.—1 - (o-bromobenzyl)hexahydrothiapyrylium chloride*

24.0 grams (0.117 mole) of o-bromobenzyl chloride is dissolved in 30 milliliters of nitromethane and 12.0 grams (0.117 mole) of tetrahydrothiapyran mixed with the above solution. This operation is carried out with stirring and cooling and at a temperature below 50° C. Several hours following the mixing of the reagents, the reaction mixture is cooled to room temperature, diluted with a benzene-hexane mixture and thereafter filtered to separate a 1 - (o-bromobenzyl)hexahydrothiapyrylium chloride product as a crystalline solid.

In a similar manner other halobenzyl tetrahydrothiophenium and hexahydrothiapyrylium halides may be prepared as follows:

1-(p-bromobenzyl)tetrahydrothiophenium bromide by the reaction of p-bromobenzyl bromide with tetrahydrothiophene.

1-(2,4,6-tribromobenzyl)hexahydrothiapyrylium iodide by the reaction of 2,4,6-tribromobenzyl iodide with tetrahydrothiapyran.

1-(2,3,4,5,6-pentachlorobenzyl)hexahydrothiapyrylium iodide by the reaction of 2,3,4,5,6-pentachlorobenzyl iodide with tetrahydrothiapyran.

1-(p-chlorobenzyl)tetrahydrothiophenium chloride by the reaction of p-chlorobenzyl chloride with tetrahydrothiophene.

The products of the preceding examples are effective as germicides and are adapted to be employed for the control of bacterial and fungal organisms. In a representative operation, 1-(o-chlorobenzyl)tetrahydrothiophenium iodide was employed for the control of the soil-dwelling fungi, *Fusarium solani, Phythium spp.* and *Rhizoctonia solani*. In such operations, 100 percent controls were obtained at dosages of 25 and 5 parts by weight of 1 - (o-chlorobenzyl)tetrahydrothiophenium iodide per million parts by weight of soil.

The halobenzyl halides to be employed as starting materials as previously described may be prepared by several known methods. In a convenient method the compounds are prepared by side chain chlorination or bromination of an appropriate ring-halogenated toluene. In such method, the halogenated toluene is treated with a halogenating agent such as chlorine or bromine at a temperature of from 110° to 175° C. Following the reaction, the desired product is separated by fractional distillation under reduced pressure.

The halobenzyl iodides to be employed as starting materials may be prepared by heating an aqueous acetone solution of the corresponding halobenzyl bromide as prepared above with a slight excess of potassium iodide. Following the reaction, the mixture is diluted with water to precipitate the iodide as a crystalline solid which may be separated by conventional methods.

I claim:

1. A compound having the formula

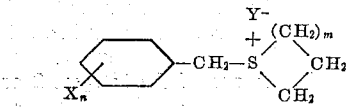

wherein X represents halogen of the group consisting of bromine and chlorine, $n$ is an integer from 1 to 5, inclusive, Y represents a member of the group consisting of chlorine, bromine and iodine and $m$ is selected from the integers 2 and 3.

2. 1-(o-chlorobenzyl)hexahydrothiapyrylium iodide.
3. 1-(o-chlorobenzyl)tetrahydrothiophenium iodide.
4. 1-(p-chlorobenzyl)tetrahydrothiophenium iodide.
5. 1 - (2,4 - dichlorobenzyl)tetrahydrothiophenium iodide.
6. 1-(o-chlorobenzyl)tetrahydrothiophenium bromide.

References Cited in the file of this patent

UNITED STATES PATENTS

| | | |
|---|---|---|
| 2,695,286 | Dearborn | Nov. 23, 1954 |
| 2,729,649 | Boettcher | Jan. 3, 1956 |
| 2,748,145 | Muetterties | May 29, 1956 |

OTHER REFERENCES

Braun: Berichte 43: 545–51 C. A. 4:131014 (methiodide of thiolane and tetrahydrothiapyran).